Oct. 3, 1939.    D. E. DASHER    2,174,623
REFRIGERATING APPARATUS
Filed Jan. 29, 1937

INVENTOR.
DON E. DASHER.
BY
Spencer, Hardman and Fehr.
HIS ATTORNEYS.

Patented Oct. 3, 1939

2,174,623

UNITED STATES PATENT OFFICE 2,174,623

REFRIGERATING APPARATUS

Don E. Dasher, Dayton, Ohio, assignor to General Motors Corporation, Dayton, Ohio, a corporation of Delaware Application January 29, 1937, Serial No. 123,032

4 Claims. (Cl. 308—36.2)

This invention relates to refrigerating apparatus and more particularly to seals for compressors of such apparatus.

In refrigerating systems wherein a motor which drives the compressor thereof is separate from the compressor it is necessary to provide a seal for that portion of the compressor shaft which extends outwardly of the compressor crankcase. Since the compressor shaft is ordinarily formed of relatively soft steel, so as to permit same to be readily machined, it is itself unsuitable for use as a sealing part of the compressor seal because the friction at such sealing point will, after continued operation of the compressor, cause wear of and damage to the shaft thereby rendering it necessary to remove the shaft from the compressor when the seal becomes worn and ineffective. I am aware that others have in some manner or another provided a hardened seal ring on a compressor shaft to eliminate wear of the shaft to thereby obviate the necessity of removing the shaft from the compressor when the seal becomes ineffective. Some have placed a hardened ring on a compressor shaft by temperature shrinkage, after applying heat thereto, while others have devised various means for securing a hardened ring to a shaft, such for example, as by placing a resilient member between the ring and the shaft to prevent movement of the ring relative to the shaft to thereby insure rotation of the ring with the shaft. A certain amount of success has been derived from these prior methods of providing a hardened ring on a compressor shaft but they have not been entirely satisfactory. For example, if a hardened ring is sweated to the shaft by the application of heat thereto the shaft ofttimes warps and becomes deformed to such a degree that it will not align properly with the bearings provided therefor in the compressor crankcase. If a resilient member is placed between the hardened ring and the shaft to secure the ring to the shaft and cause rotation thereof therewith the resilient material of the securing member soon becomes deteriorated by the refrigerant and lubricant contained in the compressor and is ineffective for the purpose for which it was intended. My invention is therefore directed to overcoming the difficulties heretofore attendant the securing of a hardened ring, for forming a sealing surface portion of a compressor seal, to a compressor shaft.

One of the objects of my invention is to provide an improved seal for the drive shaft of a compressor of a refrigerating system.

Another object of my invention is to provide an improved method of applying a hardened sealing ring to a compressor shaft.

Another object of my invention is to provide a seal for the drive shaft of a compressor of a refrigerating system which seal includes a hardened sealing member integrally secured to the compressor shaft in an improved manner.

A further object of my invention is to permanently secure one portion of a compressor seal to the compressor shaft without application of heat to the shaft or to the seal portion to be secured thereto.

A still further object of my invention is to secure one portion of a compressor seal to the compressor shaft by causing one portion of the seal to be integrally united with the shaft.

In carrying out the foregoing objects it is a more specific object of my invention to secure a hardened member of a compressor seal to the compressor shaft by electroplating a continuous band or collar to the shaft and to the hardened member to cause the member to be integrally united or permanently bonded to the shaft.

Further objects and advantages of the present invention will be apparent from the following description, reference being had to the accompanying drawing, wherein a preferred form of the present invention is clearly shown.

Figure 1:
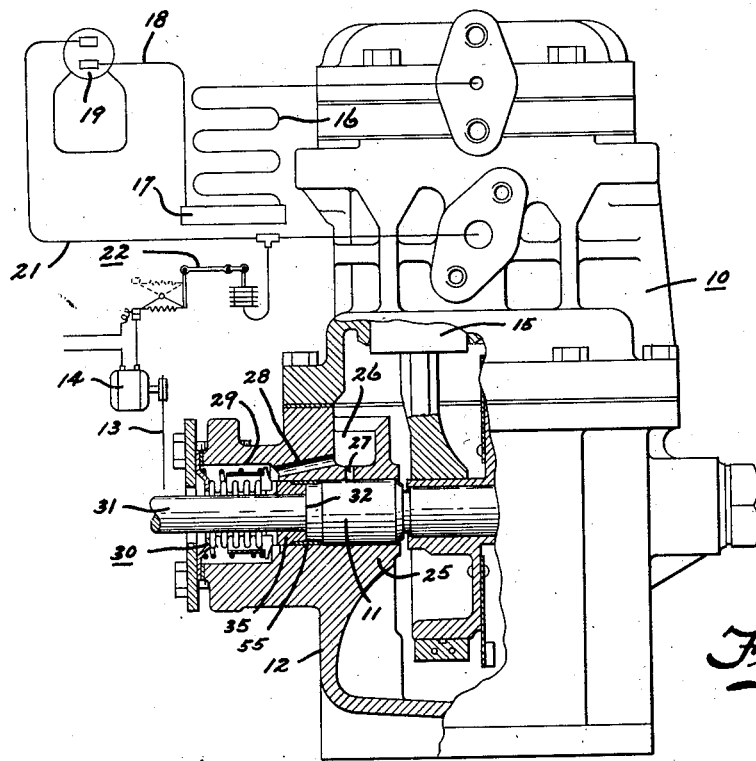
Fig. 1 is a view of a refrigerating system, partly diagrammatic, including a compressor provided with a shaft seal embodying my invention.

I have disclosed in Fig. 1 of the drawing a refrigerating system provided with a conventional reciprocating compressor 10, preferably containing a refrigerant and lubricant, provided with a drive shaft 11 which projects outwardly of the crankcase 12 of the compressor to receive a pulley (not shown) which is driven, through the medium of a belt 13, by an electric motor 14 separate from the compressor 10. Pistons 15 of the compressor 10 draw evaporated refrigerant into crankcase 12 and discharge the compressed refrigerant through the head portion of the compressor to a condenser 16. The compressed refrigerant received in condenser 16 is cooled and liquefied, with the aid of any suitable cooling medium, from where it flows and is collected in the receiver 17. From the receiver 17 the liquefied refrigerant is forwarded through a supply conduit 18 to an evaporating means or cooling element 19 shown as the conventional float controlled flooded type. Liquid refrigerant is evaporated within the element 19 under reduced pressure, created by operation of the compressor 10, and is returned to the compressor crankcase through a gaseous refrigerant return conduit 21. Operation of the electric motor 14 and consequently compressor 10 is controlled by a switch means 22, preferably of the snap-acting type, in accordance with the temperature and pressure of the evaporating means 19 as is conventional in the art.

The wall of crankcase 12 of compressor 10 is provided with a bearing 25 which receives one end of the drive shaft 11 and which is provided with a lubricant receptacle 26 for collecting a portion of the lubricant splashed about within the crankcase of compressor 10. This receptacle 26 is provided with an oil passage 27 extending to the bearing surface of bearing 25 and a second passage 28 leading to a cavity or hollow boss portion 29 provided in the wall of the compressor crankcase 12 and surrounding the outer end of the drive shaft 11. Within the hollow base 29 there is provided a shaft seal structure generally designated by the reference character 30 and which surrounds the reduced end portion 31 of the compressor drive shaft 11 extending from a shoulder 32 formed adjacent the bearing portion of the shaft.

Figure 2:
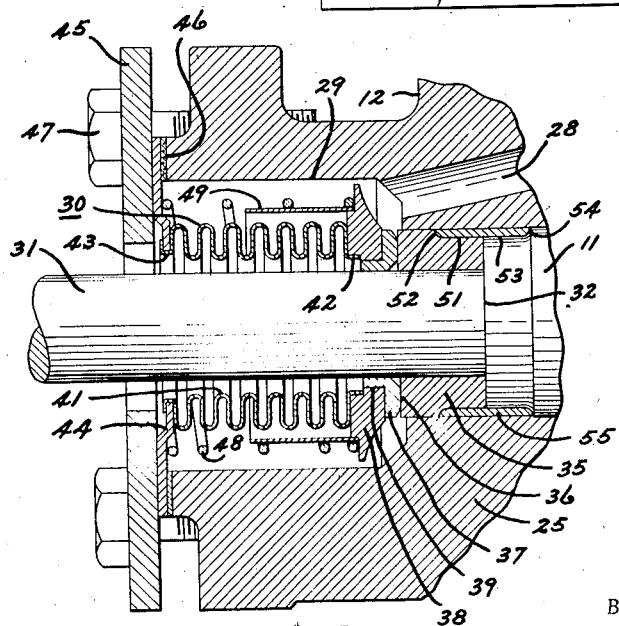
Fig. 2 is an enlarged vertical sectional view of the shaft seal disclosed in Fig. 1.

Referring now more particularly to Fig. 2 of the drawing it will be noted that there is a nitralloy ring 35 surrounding the reduced end portion 31 of shaft 11 and abutting the shoulder 32 formed on the shaft. The construction of this ring 35 and the manner of attaching same to shaft 11 to cause rotation thereof with the shaft will be hereinafter described. Ring 35 has a smooth flat end portion 36 forming a vertical sealing surface adapted to be engaged by an annular sealing member 37. The ring 35 and member 37 form two sealing members of the compressor shaft seal structure 30. The sealing member 37 is preferably formed of a special bronze material possessing lubricating properties and which is now conventional and well-known to those skilled in the art. This member 37 has an annular ring 38 surrounding and secured to a shoulder portion 39 formed on member 37. A bellows 41 has its one end 42 secured to the inner portion of ring 38 and has its outer end 43 secured to the wall of an opening provided in a plate 44. Plate 44 of the sealed structure is clamped, by a suitable clamping band 45, resilient washer 46 and bolts 47, to the end portion of the compressor crankcase 12 adjacent the cavity or hollow boss 29. A spring 48 is interposed between the annular ring 38 and end plate 44 to apply its compressive force to the abutting sealing members 35 and 37 of the sealed structure 30 to hold these members in tight sealing engagement with one another for sealing the compressor fluid tight at this point. A tubular element 49 is secured to ring 38 and extends therefrom within and preferably in contact with the coils of spring 48 to properly align the spring and to also prevent vibration thereof and consequently generation of noise during rotation of shaft 11.

Figure 3:
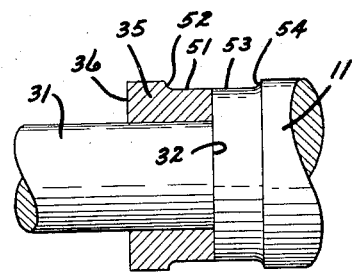
Fig. 3 is a view showing one portion of the seal in a position adapted to be secured to a compressor shaft in accordance with my invention.

Having enumerated the various component parts of the compressor seal structure I will now describe the construction and method of securing the nitralloy seal ring 35 to shaft 11 which constitutes my improvement. The ring 35 is nitrated and hardened and has its surfaces ground flat and smooth. A portion of the outer annular surface of ring 35 is cut away as at 51 to provide a rounded shoulder 52 thereon. This portion of ring 35 matches a corresponding but oppositely disposed similar cut-away portion 53 forming a rounded shoulder 54 on shaft 11 inwardly of the shaft from shoulder 32 provided thereon. When the nitralloy ring 35 is placed over the reduced end portion of shaft 11 and brought against shoulder 32 on the shaft there is provided, by the cut-away portions 51 and 53 on ring 35 and shaft 11, respectively, a groove or cavity in the annular bearing surface of ring 35 and shaft 11 (see Fig. 3). In order to permanently secure the hardened nitralloy ring 35 to shaft 11 I provide a collar or band 55 (see Fig. 2) within this groove or cavity to thereby bond or unite the ring 35 to shaft 11. After ring 35 is mounted upon shaft 11 the shaft with the ring thereon is arranged to form the cathode in any suitable electroplating or depositing process well known to those skilled in the art. In order to protect all surfaces of the ring 35 and shaft 11, from being copper plated while the same is serving as the cathode in the electrodepositing process and to insure that copper will be plated to the ring 35 and shaft 11 only in the groove or cavity, provided by the cut-away portions 51 and 53 I protect the exposed surfaces of the ring and shaft by covering same in any suitable manner such as with a waxy substance or rubberized material. During the plating process copper is deposited little by little within the groove or cavity upon the exposed annular surfaces of ring 35 and shaft 11 until the collar or band 55 attains the desired thickness. The copper band 55 may then be ground flush with the annular outer portion of shaft 11 which forms the bearing surface thereof fitting within bearing 25. The copper band or collar 55 integrally unites or bonds the nitralloy ring 35 to shaft 11 to thereby provide an integral hardened shoulder on shaft 11 for abutment with the bronze ring portion 37 of the compressor seal 30. The copper band 55 in addition to bonding the hardened seal ring 35 to shaft 11 also forms at least a portion of the annular bearing surface of shaft 11 which rotates within the crankcase bearing 25.

It will be seen that I have provided an improved shaft seal for compressors or the like and that the one portion of the seal is permanently secured to the compressor shaft in a novel and practical manner without the application of heat to thereby obviate the difficulties heretofore enumerated. By virtue of my invention the shaft, after being machined and properly aligned with the compressor bearings, will not be damaged or deformed upon attaching a hardened seal ring portion of the compressor seal thereto. I have thereby eliminated waste while at the same time insuring alignment of shafts with compressor bearings, after the hardened seal member is secured to the shaft to afford a proper fit therebetween to thus prolong the life of compressors. My improved method of securing a hardened seal ring to a shaft and the location and arrangement of the sealing means as disclosed provides a plated annular bearing surface portion of the shaft bearing which is rotatable within the compressor crankcase bearing.

While the form of embodiment of the invention as herein disclosed, constitutes a preferred form, it is to be understood that other forms might be adopted, all coming within the scope of the claims which follow.

What is claimed is as follows:

1. In a compressor having a crankcase provided with an opening in the wall thereof and having a rotary shaft extending through the crankcase opening and a device for sealing the shaft fluid tight at the opening, said device comprising a seal structure including abutting sealing members, one of said members being of different material than the shaft and being secured to the compressor shaft to prevent movement thereof relative to the shaft and for causing rotation thereof with the shaft, said securing means including metallic means integrally united with the compressor shaft and with said one sealing member.

2. In a compressor having a crankcase provided with an opening in the wall thereof and having a rotary shaft extending through the crankcase opening and a device for sealing the shaft fluid tight at the opening, said device comprising a seal structure including abutting sealing members, one of said members being of different material than the shaft and being secured to the compressor shaft to prevent movement thereof relative to the shaft and for causing rotation thereof with the shaft, said securing means including a copper bonding element integrally united with the compressor shaft and with said one sealing member.

3. In a compressor having a crankcase provided with an opening in a wall thereof and a bearing adjacent the opening and having a rotary shaft provided with a bearing surface fitting in the crankcase bearing and provided with a portion extending through the crankcase opening and a device for sealing the shaft fluid tight at the opening, said device comprising a seal structure including abutting sealing members, one of said members being of different material than the shaft and being secured to the compressor shaft to prevent movement thereof relative to the shaft and for causing rotation thereof with the shaft, said securing means including metallic means integrally united with the compressor shaft and with said one sealing member, and said metallic means being disposed within the shaft bearing and forming at least a portion of the bearing surface of the shaft.

4. In a compressor having a crankcase provided with an opening in a wall thereof and a bearing adjacent the opening and having a rotary shaft provided with a bearing surface fitting in the crankcase bearing and provided with a portion extending through the crankcase opening and a device for sealing the shaft fluid tight at the opening, said device comprising a seal structure including abutting sealing members, one of said members being of different material than the shaft and being secured to the compressor shaft to prevent movement thereof relative to the shaft and for causing rotation thereof with the shaft, said securing means including a copper bonding element integrally united with the compressor shaft and with said one sealing member, and said copper bonding element being disposed within the shaft bearing and forming at least a portion of the bearing surface of the shaft.

DON E. DASHER.